(12) United States Patent
Pribonic

(10) Patent No.: US 6,659,237 B1
(45) Date of Patent: Dec. 9, 2003

(54) EDDY CURRENT BRAKE

(75) Inventor: Edward M. Pribonic, Seal Beach, CA (US)

(73) Assignee: Magnetar Technologies, Ltd., Seal Beach, CA (US)

( * ) Notice: Subject to any disclaimer, the term of this patent is extended or adjusted under 35 U.S.C. 154(b) by 53 days.

(21) Appl. No.: 09/880,353

(22) Filed: Jun. 13, 2001

Related U.S. Application Data

(63) Continuation-in-part of application No. 09/447,206, filed on Nov. 22, 1999.

(51) Int. Cl.⁷ .................................................. B60L 7/28
(52) U.S. Cl. ................................... 188/165; 108/180
(58) Field of Search ................................ 188/159, 161, 188/164, 165, 180, 41, 84; 104/250

(56) References Cited

U.S. PATENT DOCUMENTS

| | | | | |
|---|---|---|---|---|
| 4,301,623 A | * | 11/1981 | Demukai | 16/78 |
| 5,127,599 A | * | 7/1992 | Veraart | 104/292 |
| 5,195,618 A | * | 3/1993 | Wu | 188/164 |
| 5,277,125 A | * | 1/1994 | DiFonso et al. | 104/292 |
| 5,465,815 A | * | 11/1995 | Ikegami | 188/164 |
| 6,062,350 A | * | 5/2000 | Spieldiener et al. | 188/161 |
| 6,227,334 B1 | * | 5/2001 | Yumura et al. | 187/359 |
| 6,293,376 B1 | * | 9/2001 | Pribonic | 187/350 |
| 6,361,268 B1 | * | 3/2002 | Pelrine et al. | 104/284 |
| 6,412,611 B1 | * | 7/2002 | Pribonic | 187/375 |

FOREIGN PATENT DOCUMENTS

WO    WO 96/32172    * 10/1996

* cited by examiner

Primary Examiner—Jack Lavinder
Assistant Examiner—Bradley King
(74) Attorney, Agent, or Firm—Walter A. Hackler

(57) ABSTRACT

An eddy current brake includes a diamagnetic member, a first support wall and a second support wall with the first and second linear arrays of permanent magnets disposed on the walls facing one another. Apparatus is provided for moving at least one of the walls in order to control eddy current induced in the member in the passage of the member therepast to adjust the braking force between the magnets and the member. Apparatus is also provided for causing the velocity of the member to change the braking force between the magnets and the member.

10 Claims, 4 Drawing Sheets

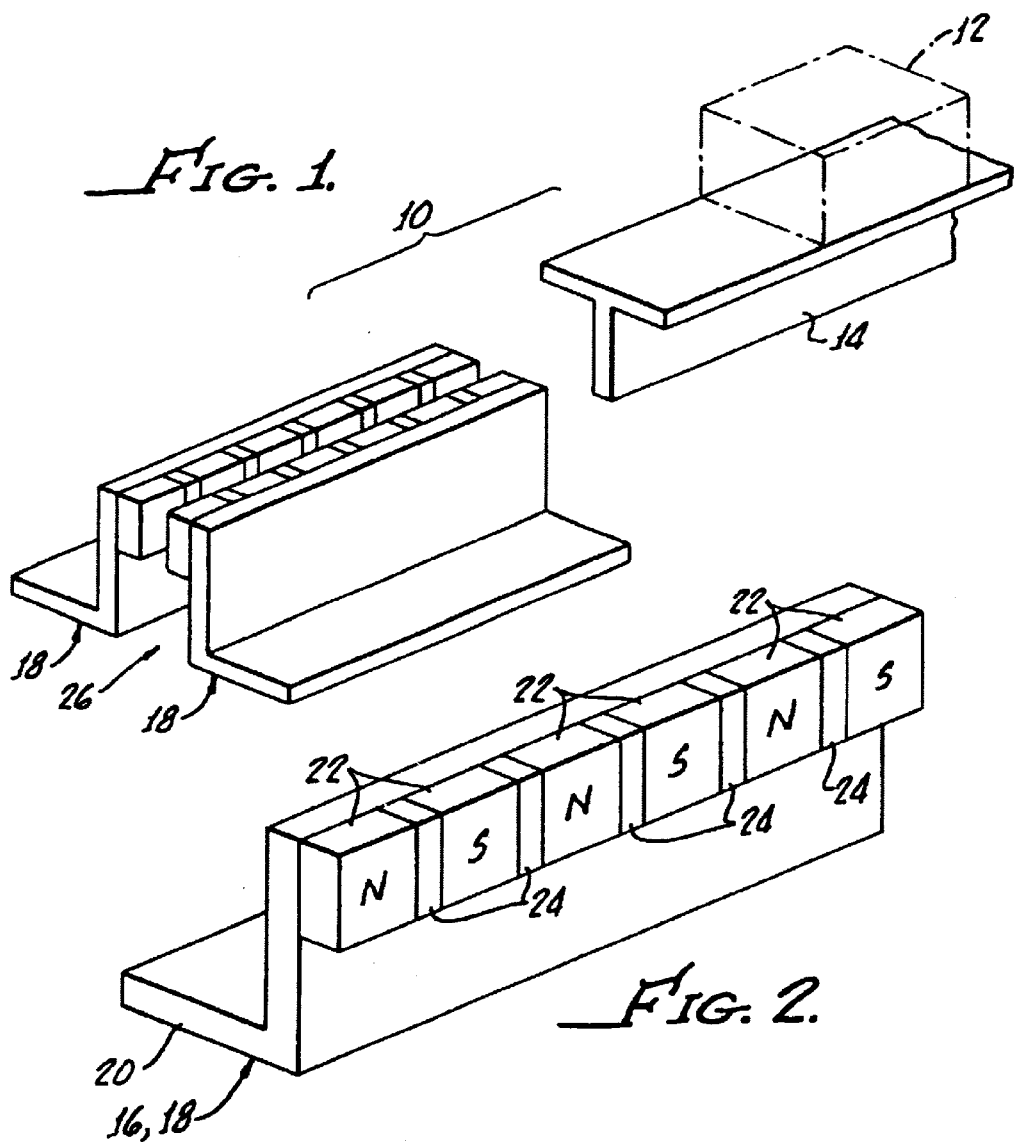
FIG. 1.
FIG. 2.
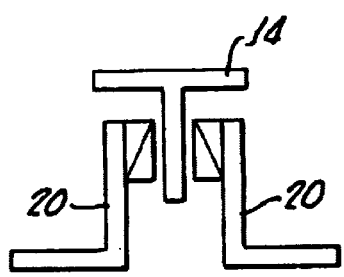
FIG. 3.

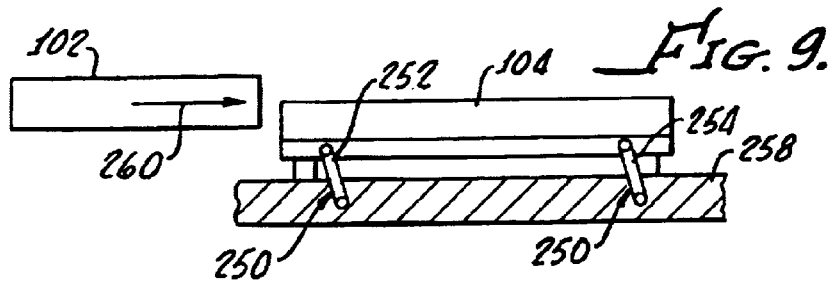
FIG. 9.
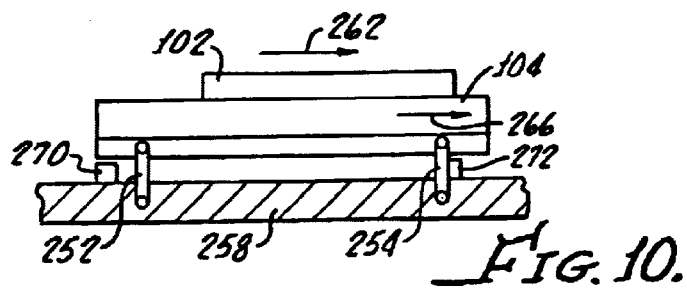
FIG. 10.
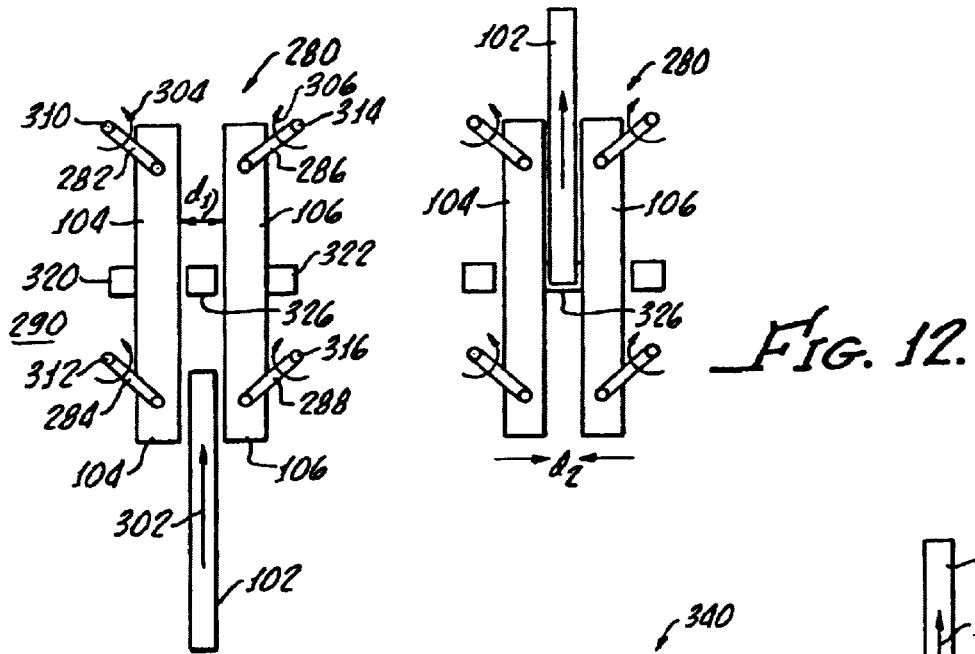
FIG. 11.
FIG. 12.
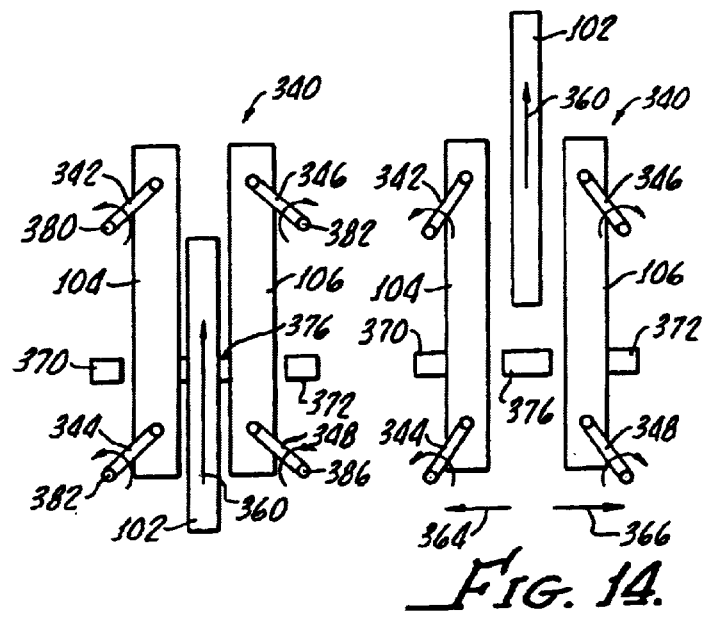
FIG. 13.
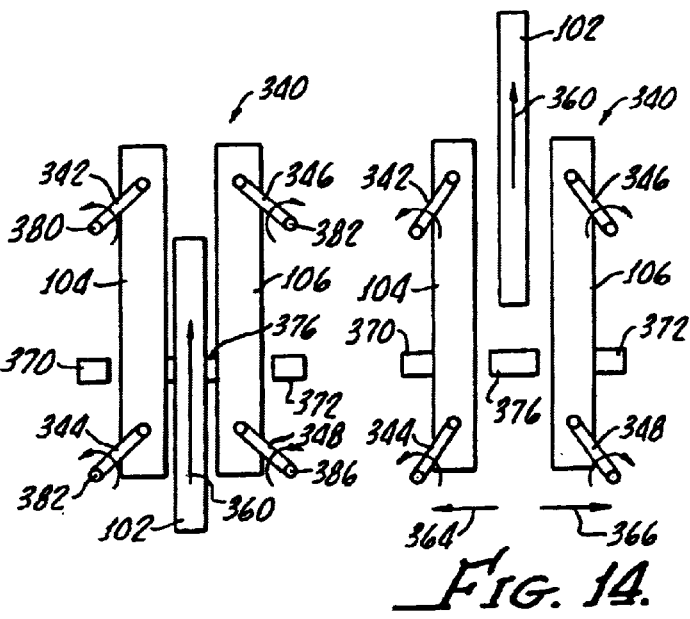
FIG. 14.

EDDY CURRENT BRAKE

The present application, is a continuation-in-part of U.S. patent application Ser. No. 09/447,206 filed Nov. 22, 1999.

The present invention is generally related to permanent magnet linear brakes and is more particularly directed to an eddy current brake and magnet system for providing adjustable braking for movable cars, for example, rail support cars, go cars, elevator cars, conveyer car, roller coaster cars among other.

Heretofore, eddy current braking system for providing deceleration of moving apparatus have utilized physically fixed magnets which provided no opportunity to adjust braking before or during passage of a diamagnetic member past a linear array of permanent magnets.

Accordingly, such prior art systems, when installed for decelerating a plurality of cars on a track, can not accommodate for variations in car weight and size.

The present invention provides for a unique permanent array arrangement and apparatus for adjusting braking force before and/or during passage of a car past a selected point.

SUMMARY OF THE INVENTION

An eddy current brake in accordance with the present invention generally includes a diamagnetic or non-magnetic member, a first support wall and a separate second support wall disposed in a spaced apart relationship with the first support wall for enabling the member to pass therebetween.

A first linear array of permanent magnets is disposed on the first wall on the side facing the second wall and a second linear array of permanent magnets is disposed on the second wall on the side facing the first wall. The first and second arrays are parallel with one another and spaced apart from one another for allowing passage of the member therebetween and causing eddy current to be induced in the member which results in the braking force between the magnets and the member. No magnetic connection, such as a yoke, is required between the walls or the arrays of permanent magnets. This feature enables adjustability of the distance between the member and the magnet arrays.

In accordance with the present invention, apparatus is provided for moving a least one of the first and second walls in order to control eddy current induced in the member during the passage of the member therepast in order to adjust braking force between the magnets and the member. In one embodiment of the present invention, the apparatus includes means for moving at least one of the first and second walls in a direction perpendicular to the member, and in another embodiment of the present invention, the apparatus includes means for moving at least one of the first and second walls in a direction parallel to the member.

Thus, it can be seen that the apparatus in accordance with the present: invention provides for changing the spaced apart relationship between the first and second walls in order to control eddy current induced in the member during passage and adjust a braking force between the magnets and member.

Accordingly, the amount of deceleration provided to a given car may be adjusted in accordance with the present invention. In addition, cars of various sizes and weights may be utilized and the eddy current magnetic brake in accordance with the present invention adjusted to provide the proper, or desired, deceleration. In one embodiment to the present invention, apparatus is provided for adjusting the eddy current induced in the member, and the braking force, as a function of velocity of the member between the arrays. Thus, cars having various velocities upon passing the brake, can be decelerated to a more uniform velocity exiting the brake in accordance with the present invention.

In this embodiment of the brake, the apparatus for adjusting eddy current includes a linkage mounting at least one of the first and second walls to a fixed foundation for enabling movement of the member therepast to change a distance between at least one of the first and second walls and the member. More particularly, the linkage may provide for changing a spaced apart relationship between the first and second walls.

An embodiment of the present invention includes linkage for enabling movement of the member to change a transverse relationship between at least one of the first and second walls of the member and another embodiment provides linkage for enabling movement of the member to change a parallel relationship between the first and second walls and the member.

Magnetic coupling and inducement of eddy current is effective through a linear array of permanent magnets which includes a channel and plurality of magnets disposed therein. The magnets may be arranged within the channel in two adjacent rows with each magnet in each row being arranged with a magnetic field at a 90° angle to adjacent magnets in each row along the channel. Each magnet in each row is also arranged with a magnetic field at an angle to another adjacent magnet in the adjacent row.

BRIEF DESCRIPTION OF THE DRAWINGS

The advantages and features of the present invention will be better understood by the following description when considered in conjunction with the accompanying drawings in which:

FIG. 1 is a perspective view of an eddy current brake in accordance with the present invention generally showing first and second spaced apart support walls and first and second linear arrays of permanent magnets along with a diamagnetic or nonmagnetic member attached to moving apparatus such as a car, represented by dashed line;

FIG. 2 is a perspective view of a first linear array of permanent magnets disposed upon a first support walk;

FIG. 3 is an elevational view of the brake shown in FIG. 1;

FIGS. 9 and 10 show embodiment of the present invention similar to that shown in FIGS. 8 and 9 and further including apparatus for adjusting eddy current induced and the member, and braking force, is a function of velocity of the member between arrays of magnets;

FIGS. 11–14 are diagrams of alternative embodiments of the present invention which provide for linkage from at least one of the first and second walls to a fixed foundation for enabling movement of the member past the first and second walls with the first and second magnet arrays thereon to change a perpendicular relationship between the first and second walls and the member.

DETAILED DESCRIPTION

Figure 4:
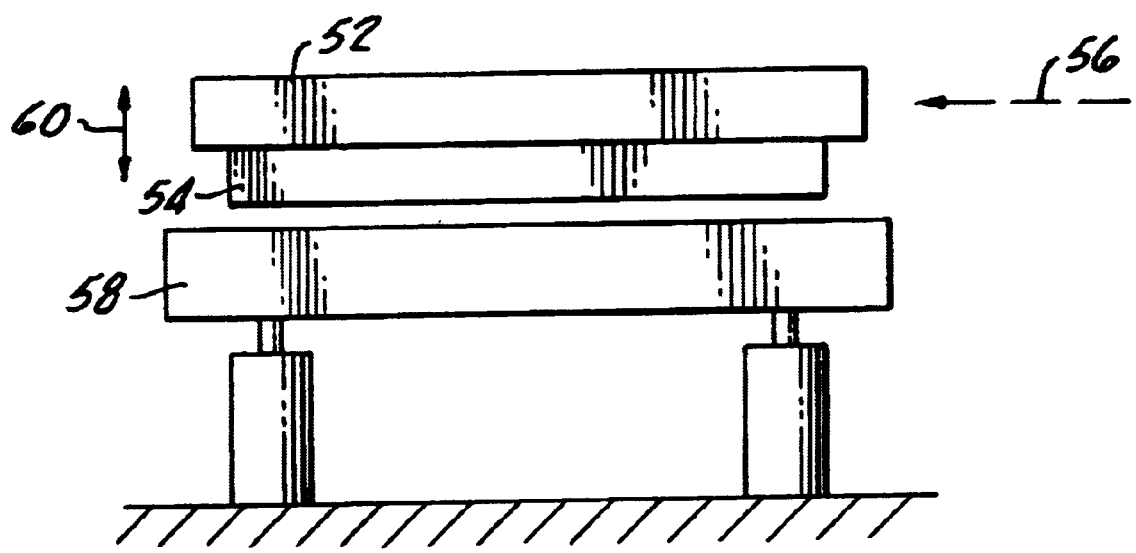
FIG. 4 shows a selectively actuatable brake system disengaged.

For the ensuing description of a braking apparatus 10 for an object 12, reference is made particularly to FIGS. 1–3. The object 12 is shown in generalized form only and is contemplated for movement in the direction of the arrow. Affixed to the object 12 is a member, or fin, 14 which extends outwardly from the object 12 and also moves with the object in the direction of arrow 15.

At some point along the path of movement there are mounted first and second laterally spaced magnet arrays 16 and 18. Each array includes an elongated support wall 20 which may be any cross-section, such as, for example an L-shaped cross-section, and on a lateral surface thereof, there are provided a linear series of permanent magnets 22, of any size, arrangement or configuration. For instance, the magnets may alternate in polarity as indicated by the identification letters "S" and "N". Also, the space 26 between the arrays is dimensioned and arranged with respect to the object path of movement, that the fin 14 will move along the space directly opposite the magnets and spacers, but remain out of physical contact with either the magnets or spacers.

When the fin 14 passes through the magnetic field existing in the space 26, an electric current (eddy current) is induced in the fin 14 which, in this case, reverses as the fin passes from a magnet of one polarity to a magnet of opposite polarity. These eddy currents produce a force exerted on the fin 14 (and object 12) of such direction as to reduce the velocity of movement of object 12 and fin 14. It is this deceleration that produces the "braking" of the present invention.

Although the above-described first embodiment includes movement of the object and fin past fixedly located magnet arrays, the magnet arrays can just as well be moved past a stationary object and fin. All that is needed to achieve the braking effect is relative movement between the magnets and fin. Since usually the object is moving, in that case the magnet arrays would be carried by the object and the fin fixedly mounted adjacent the path of movement. The choice of which technique to employ depends upon the particular application.

In its more general aspects, the invention can be advantageously employed for braking a large variety of moving objects. As an excellent example, eddy current braking for elevators could be highly advantageous as an emergency measure where normal operation has somehow been interfered with or disrupted. Also, many amusement park rides could benefit by having eddy current braking devices to retard excessive speed as the "ride" vehicle takes a corner or drops at a severe angle.

Figure 5:
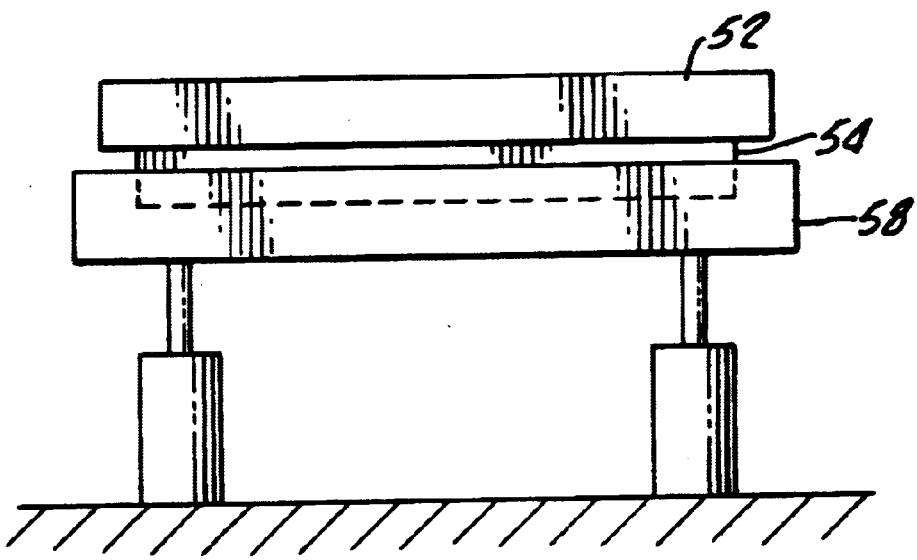
FIG. 5 shows a system of FIG. 8 engaged.

FIGS. 4 and 5 illustrate an object 52 with a brake fin 54 interconnected therewith, that moves generally along a direction indicated by an arrow 56 which normally will pass by a magnet carrier 58 beyond the range of substantial magnetic interaction (FIG. 4). The object 52 and fin 54 are provided with means 60 selectively actuatable for moving them toward the magnet carrier so as to effect magnetically coupling therewith (FIG. 5) and achieve braking.

Figure 6:
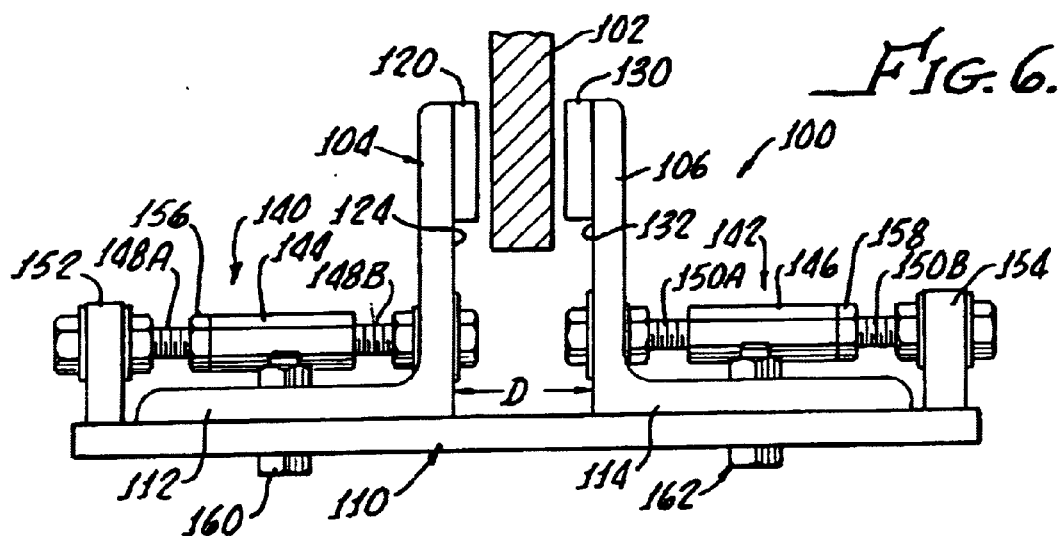
FIG. 6 is an elevational view of an alternative embodiment according with the present invention further showing apparatus for moving at least one of the first and second walls in order to control the distance between permanent magnets and opposing walls for adjusting braking force between the magnets and a member.
Figure 7:
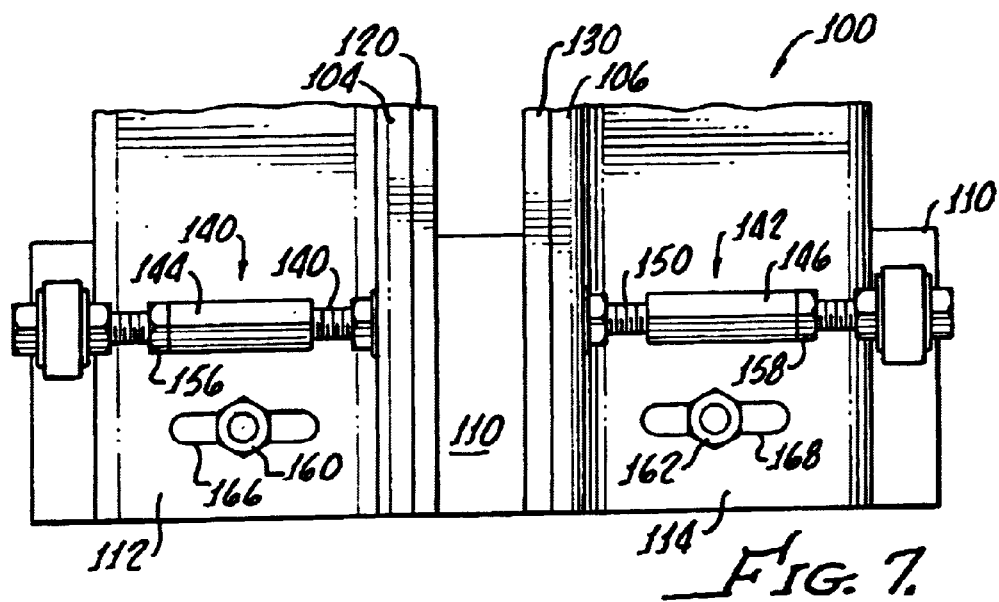
FIG. 7 is plan view of the brake shown in FIG. 6.

With reference to FIGS. 6 and 7, there is shown an alternate embodiment 100 of the eddy current brake in accordance with the present invention generally including a diamagnetic or non-magnetic member 102, a first support wall 104 and a second support wall 106. Walls 104, 106 are separate from one another and disposed in a spaced apart relationship upon a base or foundation 110 via leg portions 112, 114 respectively. The spaced apart relationship enables the member 102 to pass between the walls 104, 106 and because 104, 106 are not fixed with respect to one another, a distance D therebetween can be adjusted as will be hereinafter discussed in greater detail.

Figure 8:
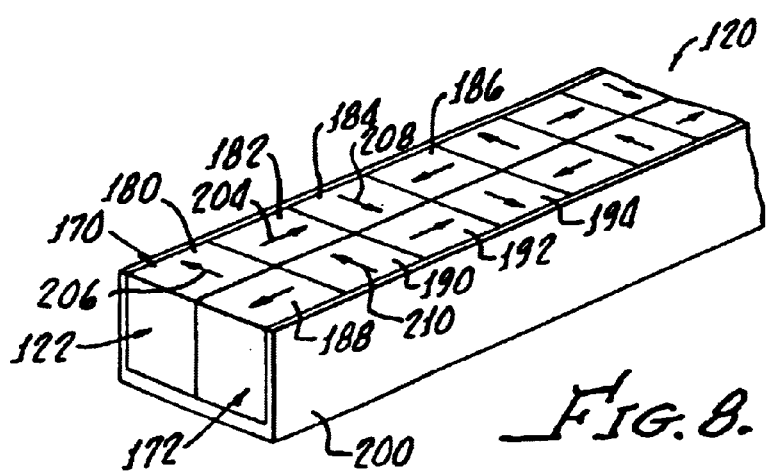
FIG. 8 is an enlarged view of a linear array of permanent magnets in accordance with the present invention generally including a channel and a plurality of magnets disposed therein in a particular arrangement as will be hereinafter described in greater detail.

A first linear array 120 of permanent magnets 122, see FIG. 8, is disposed on the first on a side 124 facing the second wall 106.

A second linear array 130 of permanents (not individually shown) are disposed on the second wall 106 on a side 132 facing the first wall 104 with the first and second arrays 120, 130 being parallel with one another as shown in FIG. 10. Apparatus 140, 142 is provided for moving the walls 104, 106 and change the spaced apart relationship between the first and second walls 104, 106 in order to control, or adjust, eddy current induced in the member 102 during passage of the member 102 past and between the walls 104, 106 and magnets 120, 130 thereby adjusting the braking force between the magnets arrays 120, 130 and the member 102.

The apparatus 140, 142 may include adjusting nuts 144, 146 and bolts 148A, 148B, 150A, 150B interconnected between the walls 104, 106 and brackets 152, 154 fixed to the base 110.

Jam nuts 156, 158 prevent unwanted movement of the adjusting nuts 144, 146 and securing bolts 160, 162 extending through the base 110 and legs 112, 114 through slots 166, 168, fix the walls 104, 106 in a desired spaced apart relationship after adjustment. The exact size of the walls 104, 106, magnet arrays 120, 130, member 102 and spacing D will be dependant upon velocity and weight of a car (not shown) attached to the member 102 and may be empirically determined.

It should be appreciated that the apparatus 140, 142 may include any number of configurations for adjustment of the walls 104, 106. Such alternatives including single direction bolts, worm screws, jack screws, short in-line turn buckles, or other electrical, pneumatic, hydraulic system capable of providing the adjustment of spacing D, between the walls 104, 106. Such configurations may eliminate a need for the securing bolts 160 and 162.

Preferably, each magnet array 120, 130, as illustrated by the array 120 in FIG. 12, includes at least 1 row 170, each having individual magnets 180, 182, 184, 186. A second row 172 may include individual magnets 188, 190, 192, 194 respectively.

The magnet rows 170, 172 may be disposed in a tube, or channel 200 which may be formed of any suitable material such as aluminum, stainless steel, plastic; any number of magnets (not all shown) may be used.

The magnets 180, 194 are specifically arranged within the channel 200 with a specific magnetic field pattern. While two rows 170, 172 are shown, it should be appreciated that any suitable number of rows (not shown) may be utilized.

The channel 200 may be removably attached in any suitable manner to the wall 104. Thus, as hereinabove noted, assembly of the brake 100 is facilitated. Another advantage of the preassembly of magnets 180–186 is the is the fact that alternative magnet configurations may be easily exchanged on the wall 104 in order to tailor magnetic braking characteristics.

More particularly, a magnet 182 in a row 170 is arranged with a magnetic field (indicated by the arrow 204) which is at an angle to the magnetic fields 206, 208 of adjacent magnets 180, 184 in the row 170. A number of angular relationship between the adjacent magnets 180, 182, 184 such as, for example, 15°, 30°, 45° or 90°. When the angular relationship between adjacent magnet 180, 182, 184 is 90°, they may also be arranged with the magnetic field 104 at a 90° angle to a magnetic field 210 of the magnet 190 in the adjacent row 172.

Preferably, the magnets 180–194 are epoxied into the channel 200 and thereafter attached to the wall 104 in any suitable manner. Also, the channel 200 may be open, as shown, or closed, (not shown) and be of any suitable shape for containing the magnets. Because the magnets may be assembled in the channel 200 before installation on the wall 104, 106, assembly of the brake 100 is facilitated. In addition, change of magnetic field can be easily performed by changing of channels (not shown) having different magnet configurations therein.

The multi-row Halbach arrangement as shown in FIG. 8, can be built with no backiron. The advantage is that most of the flux is confined to the member of fin 102 area, without needing backiron as is needed in the standard eddy current brake (not shown). The flux is concentrated between the magnet array and is small above and below the magnets. Significant weight improvements result because no backiron is used.

Multiple rows 170, 172 in proper alignment permit the use of the cubic Halbach arrangement in such a way that brakes of increasing power levels can be constructed while maintaining a fixed depth of magnet.

The Halbach array can achieve higher braking forces for the equivalent volume of magnetic material of a conventional ECB. The Halbach array reduces stray magnetic field through the inactive side of the array.

With reference to the diagrams shown in FIGS. 13 and 14, apparatus 250 including links 252, 254 interconnecting the wall 104 with a foundation 258 provides for changing, controlling, or adjusting eddy current induced in the member 102, and braking force, as a function of member 102 velocity between the walls 104, 106 and arrays 120, 130. Only one wall 104 is shown in FIGS. 13, 14 for the sake of clarity.

As shown by the directional arrows 260, 262 in FIGS. 13, 14 respectively, movement of the member 102 past the wall 104 and array 120 attached thereto provides a reaction force as shown by the arrow 266 which raises the wall 104 from stops 270, 272 in order to change a transverse relationship between the wall 4 and array 120 and the member 104. This transverse movement raises 104 increasing relative penetration of 102, which increases the induced eddy currents and braking action.

Because the drag force is a function of velocity, when the walls 104 are mounted for pivoting on the links 252, 254, the wall 104 is raised a specific height based upon the drag force generated causing rotation of the links 250, 254. Thus, the penetration of the member 102 into the magnetic flux established by the arrays 120, 130 is self regulated.

When used in one orientation, as shown in FIGS. 9, 10, the member 102 having a velocity in excess in a predetermined value would generate drag forces 266 sufficient to rotate, or pivot, the wall 104 to increase member 102 penetration and subsequently generating higher drag forces to reduce the excess velocity. As the velocity falls below the level necessary to generate drag force sufficient to fully rotate the wall 104 and pivot linkages 252, 254, the wall 104 rotates back toward the default position. How far back it rotates is a self regulating function of the velocity/drag force in that instance.

Thus, the apparatus 250 can be utilized as an automatic "trim" brake actuating only when necessary and only with a force necessary to maintain the desired velocity of the member 102 and vehicle attached (not shown). Opposite linkages (not shown) would have the effect of lowering the wall 102 upon movement of the member 102 therepast, thereby having the effect of flattening the initial drag peak and providing flatter more uniform deceleration.

As diagramed in FIGS. 11 and 12, apparatus 280 including pivoting links 282, 284, 286, 288 interconnected between a foundation 290 and the walls 104, 106 enable movement of the member as indicated by the arrow 302 to pivot the links 282, 284, 286, 288 in direction indicated by the arrows 304, 306 in order to, change a distance $d_1$ between the walls 104, 106. The magnet arrays are not shown in FIGS. 11 and 12 for the sake of clarity in describing wall 104, 106 movement. Since the walls 104, 106 carry the magnet arrays 120, 130 the distance between the arrays 120, 130 is also varied. The links 282, 284, 286, 288 may include spring loaded pivots 310, 312, 314, 316 respectively in order to bias the walls 104, 106 against stops 320, 322 in a rest position.

As shown in FIG. 12, movement of the member between the walls 104, 106 decreases the distance $d_1$ to $d_2$, thus increasing the induced eddy currents and increasing a braking action. A stop 326 defines the minimum distance $d_2$ of approach between the walls 104, 106.

Similar linkage apparatus is shown in FIGS. 13 and 14 in connection with the walls 104, 106 and member 102. In this instance, links 342, 344, 346, 348 are interconnected so that movement indicated by the arrow 360 of the member 102 causes a spread or widening as indicated by the arrows 364, 366 of the walls 104, 106. Stops 370, 372, 376 limit the movement of the walls 104, 106 in a manner similar to that described in connection with the apparatus 280 shown in FIGS. 11, 12.

Spring loaded pivots keep the walls 104, 106 initially biased against the stop 376. This configuration lowers the magnetic coupling due to movement of the member 102 between the walls 104, 106 and, as hereinabove noted, has the effect of flattening the initial drag peak and provide a flatter more uniform deceleration. It should be appreciated that other means of opening and closing arrays and lowering the walls 104, 106 may be utilized which can include other mechanical, pneumatic, hydraulic or other components (not shown) to provide the same function.

Although there has been hereinabove described an eddy current braking apparatus in accordance with the present invention for the purpose of illustrating the manner in which the invention may be used to advantage, it will be appreciated that invention is not limited thereto. Accordingly, all modifications, variations or equivalent arrangements which may occur to those skilled in the art should be considered to be within the scope of the invention as defined in the appended claims.

What is claimed is:
1. An eddy current brake comprising:
   a diamagnetic or non-magnetic member;
   a first support wall;
   a separate second support wall disposed in a spaced apart relationship with said first support wall for enabling the member to pass therebetween;
   a first linear array of permanent magnets disposed on the first wall on a side of the first wall facing the second wall;
   a second linear array of permanent magnets disposed on the second wall on a side of the second wall facing the first wall, the first and second arrays being parallel with one another; and apparatus for adjusting eddy current induced in the member, and braking force, as a function of velocity of the member between the arrays, said apparatus including linkages for enabling movement of the member therepast to change the spaced apart relationship between the first and second walls.

2. Eddy current braking apparatus comprising:

a diamagnetic or non-magnetic member;

a linear array of permanent magnets including a channel and a plurality of magnets disposed therein, the magnets being arranged within said channel in two adjacent rows, each magnet in each row being arranged with a magnetic field at a 90° angle to another adjacent magnets in each row along the channel, each magnet in each row also being arranged with a magnetic field at an angle to another adjacent magnet in the adjacent row; and;

means, mounting the linear array with respect to the member, for enabling passage past one another at a distance sufficient to cause eddy currents to be induced in the member resulting in a braking force between the linear array and the member.

3. The brake according to claim 2 further comprising a second linear array of permanent magnets including a second channel and a plurality of magnets disposed therein, the magnets being arranged within said second channel in two adjacent rows, each magnet in each row being arranged with a magnetic field at a 90° angle to adjacent magnets in each row along said second channel, each magnet in each row also being arranged with a magnetic field at a 90° angle to another adjacent magnet in the adjacent row; and means, mounting the second linear array with respect to the member, for enabling passage past one another at a distance sufficient to cause eddy currents to be induced in the member resulting in a braking force between the linear array and the member.

4. The brake according to claim 3 further comprising a first support wall for, supporting the linear array, and second wall for supporting the second linear array and apparatus for moving at least one of the first and second walls in order to control the eddy current induced in the member during passage of the member therepast to adjust braking force between the magnets and the member.

5. The brake according to claim 4 wherein the apparatus includes means for moving at least one of the first and second walls in a direction perpendicular to the member.

6. The brake according to claim 4 wherein the apparatus includes means for moving at least one of the first and second walls in a direction parallel to the member.

7. The brake according to claim 3 further comprising a first support wall for supporting the linear array, a second wall, disposed in a spaced apart relationship with said first support wall, for supporting the second linear array and apparatus for changing the spaced apart relationship between the first and second walls in order to adjust eddy current induced in the member, and braking force, as a function of velocity of the member between the arrays.

8. The brake according to claim 7 wherein the apparatus for adjusting eddy current includes a linkage mounting at least one of the first and second walls to a fixed foundation, for enabling movement of the member therepast to change a distance between at least one of the first and second walls and the member.

9. The brake according to claim 7 wherein the apparatus for adjusting eddy current includes linkages, mounting the first and second walls to a fixed foundation, for enabling movement of the member therepast to change the spaced apart relationship between the first and second walls.

10. An eddy current brake comprising:

a diamagnetic or non-magnetic member;

a first linear array of permanent magnets;

a second linear array of permanent magnets disposed in a spaced apart relationship with said first linear array for enabling the member to pass therebetween, the first and second arrays being parallel with one another; and apparatus for adjusting eddy current induced in the member, and braking force, as a function of velocity of the member between the arrays, said apparatus including linkages for enabling movement of the member therepast to change the spaced apart relationship between the first and second arrays.

\* \* \* \* \*